US006876623B1

(12) United States Patent
Lou et al.

(10) Patent No.: US 6,876,623 B1
(45) Date of Patent: Apr. 5, 2005

(54) TUNING SCHEME FOR CODE DIVISION MULTIPLEX BROADCASTING SYSTEM

(75) Inventors: Hui-Ling Lou, Murray Hill, NJ (US); Zulfiquar Sayeed, Easy Windsor, NJ (US); Vijitha Weerackody, Watchung, NJ (US)

(73) Assignee: Agere Systems Inc., Allentown, PA (US)

(*) Notice: Subject to any disclaimer, the term of this patent is extended or adjusted under 35 U.S.C. 154(b) by 0 days.

(21) Appl. No.: 09/250,743

(22) Filed: Feb. 16, 1999

Related U.S. Application Data (63) Continuation-in-part of application No. 09/220,722, filed on Dec. 24, 1998, which is a continuation-in-part of application No. 09/203,663, filed on Dec. 2, 1998.

(51) Int. Cl.[7] .............................................. H04J 11/00
(52) U.S. Cl. ...................................... 370/208; 375/141
(58) Field of Search ................................ 370/208, 320, 370/315, 335, 342, 441, 203, 206, 209, 442, 480, 481, 482; 375/141, 143, 146, 151, 152, 153

(56) References Cited

U.S. PATENT DOCUMENTS

| 5,029,185 A | * | 7/1991 | Wei ............................. 375/245 |
| 5,278,863 A | | 1/1994 | Briskman |
| 5,319,673 A | | 6/1994 | Briskman |

(Continued)

FOREIGN PATENT DOCUMENTS

| EP | 1 014 608 A2 | 6/2000 |
| WO | WO/97/49207 | 12/1997 |

OTHER PUBLICATIONS

R. D. Briskman, "Satellite DAB," *International Journal of Satellite Communications*, vol. 13, pp. 259–266, 1995.
E. Dahlman et al.,, "UMTS/IMT–2000: Based on Wideband CDMA," *IEEE Communications Magazine*, vol. 36, pp. 70–81, Sep. 1998.
J. Herre et al., "The Integrated Filterbank Based Scalable MPEG–4 Audio Coder," *105th AES Convention*, San Francisco, CA, Sep. 1998.

(Continued)

*Primary Examiner*—Dang Ton
*Assistant Examiner*—Phuc Tran (57) ABSTRACT

A CDM satellite transmission system is disclosed that broadcasts programming content, such as audio and video information, using one or more geo-synchronous satellites based on Code Division Multiple Access technology. Forward error correction coding and interleaving are used prior to broadcasting the signals over the CDM channel to account for signal loss due to short-term fading. The CDM satellite transmission system provides a tuning channel corresponding to each program channel that reduces the delay when a mobile receiver is first tuned to a selected program channel. The tuning channel utilizes a shorter interleaver length, if any, than the corresponding primary program channel. The CDM satellite transmission system transmits a delayed version of a program signal with the on-time version of the audio output to accommodate uninterrupted reception in the event of such a blockage. In one implementation of the invention, the core layer, C(n), of the delayed version of the audio output of a scalable audio coding scheme is utilized as the tuning channel. The core layer, $C_1(n)$, and enhancement layers, $E_1(n)$, of the on-time signal and the enhancement layers, $E_2(n)$, of the delayed-time signal employ a representative block interleaver having a duration of four seconds. The tuning channel ($C_2(n)$, of the delayed-time signal) employs a representative block interleaver having a duration of 500 milliseconds.

61 Claims, 7 Drawing Sheets

U.S. PATENT DOCUMENTS

| | | | | |
|---|---|---|---|---|
| 5,485,485 | A | | 1/1996 | Briskman et al. |
| 5,572,332 | A | * | 11/1996 | Shin .............................. 386/96 |
| 5,592,471 | A | | 1/1997 | Briskman |
| 5,794,138 | A | | 8/1998 | Briskman |
| 5,838,669 | A | * | 11/1998 | Gerakoulis ................... 370/320 |
| 5,926,510 | A | * | 7/1999 | Suzuki ........................ 375/285 |
| 5,930,706 | A | * | 7/1999 | Raith ......................... 340/7.35 |
| 6,035,433 | A | * | 3/2000 | Sako et al. .................. 714/764 |
| 6,044,166 | A | * | 3/2000 | Bassman et al. ............. 382/103 |
| 6,064,441 | A | * | 5/2000 | Okamoto .................... 348/485 |
| 6,128,330 | A | * | 10/2000 | Schilling ..................... 375/141 |
| 6,144,707 | A | * | 11/2000 | Yoshida et al. .............. 375/316 |
| 6,198,748 | B1 | * | 3/2001 | Bruckert ..................... 370/432 |
| 6,282,412 | B1 | * | 8/2001 | Lyons ..................... 455/186.1 |
| 6,333,926 | B1 | * | 12/2001 | Van Heeswyk et al. .... 370/320 |
| 6,549,241 | B2 | * | 4/2003 | Hiroi .......................... 348/460 |

OTHER PUBLICATIONS

Chin–Lin I. and R. D. Gitlin, "Multi–Code CDMA Wireless Personal Communications Networks," *Proc. of ICC '95*, Seattle, Washington, pp. 1060–1064, Jun. 1995.

W.C. Jakes, *Microwave Mobile Communications*, 13–16, (John Wiley & Sons, 1974).

M. Kavehrad and B. Ramamurthi, "Direct–Sequence Spread Spectrum with DPSK Modulation and Diversity for Indoor Wireless Communications," *IEEE Trans. On Communications*, vol. 35, 224–236 (Feb. 1987).

J. S. Lehnert and M.B. Pursley, Multipath Diversity Reception of Spread–Spectrum Multiple–Access Communications, *IEEE Trans. On Communications*, vol. 35, 1189–1198 (Nov. 1987).

E. Lutz et al., "The Land Mobile Satellite Communication Channel–Recording, Statistics, and Channel Model," *IEEE Trans. on Vehicular Technology*, vol. 40, 375–386, (May 1991).

D.K. Sachdev, "The Worldspace System: Architecture, Plans and Technologies," *Conf. Proc. Broadcast Asia 98*, (Singapore), 219–228 (Jun. 1998).

L. Thibault et al., "EIA/NRSC DAR Systems Subjective Tests, Part II: Transmission Impairments," *IEEE Trans. on Broadcasting*, vol. 43, 353–364 (Dec. 1997).

V. Weerackody, "Effect of Time Diversity on the Forward Link of the DS–CDMA Cellular System," *Wireless Personal Communications*, vol. 7, 89–109 (Aug. 1998).

S. G. Wilson, *Digital Modulation and Coding*, 463–65, New Jersey: Prentice Hall, 1996.

"Digital Broadcasting Systems for Television, Sound and Data Services; Framing Structure, Channel Coding and Modulation for 11/12 GHz Satellite Services," European Telecommunications Standards Institute, XP–002220362, pp. 1–23 (Dec. 1994).

Cupo et al., "An OFDM All Digital In–Band–On–Channel (IBOC) AM and FM Radio Solution Using the PAC Encoder," IEEE Transaction on Broadcasting, IEEE Inc. New York, vol. 44, No. 1, XP–000834308, pp. 22–27 (Mar. 1998).

* cited by examiner

FIG. 1

| E(n) | E(n + 1) | E(n + 2) | |
|------|----------|----------|--|
| C(n) | C(n + 1) | C(n + 2) | |

$t = 4n \quad t = 4n + 4 \quad t = 4n + 8$ — 210

| $E_1(n)$ | $E_1(n + 1)$ | $E_1(n + 2)$ | |
|----------|--------------|--------------|--|
| $C_1(n)$ | $C_1(n + 1)$ | $C_1(n + 2)$ | |

— 220

| $E_2(n)$ | $E_2(n + 1)$ | $E_2(n + 2)$ | |
|----------|--------------|--------------|--|
| $C_2(n)$ | $C_2(n + 1)$ | $C_2(n + 2)$ | |

— 230

FIG. 2
PRIOR ART $t = 4n \quad t = 4n + 4 \quad t = 4n + 8$

| E(n) | E(n + 1) | E(n + 2) | |
|------|----------|----------|--|
| C(n) | C(n + 1) | C(n + 2) | |

— 310

$C^1(n) \quad C^8(n)$

| $E_1(n)$ | $E_1(n + 1)$ | $E_1(n + 2)$ | |
|----------|--------------|--------------|--|
| $C_1(n)$ | $C_1(n + 1)$ | $C_1(n + 2)$ | |

— 320

| $E_2(n)$ | $E_2(n + 1)$ | $E_2(n + 2)$ | |
|----------|--------------|--------------|--|

— 330

$C_2^1(n - 1) \quad C_2^8(n - 1)$

TUNING SCHEME FOR CODE DIVISION MULTIPLEX BROADCASTING SYSTEM

This application is a continuation-in-part of U.S. patent application Ser. No. 09/220,722, filed Dec. 24, 1998 and U.S. patent application Ser. No. 09/203,663, filed Dec. 2, 1998, which are assigned to the assignee of the present invention and incorporated by reference herein.

FIELD OF THE INVENTION

The present invention relates generally to satellite broadcasting techniques, and more particularly, to satellite broadcasting techniques based on Code Division Multiple Access (CDMA) technology.

BACKGROUND OF THE INVENTION

Satellite broadcasting systems for transmitting programming content have become increasingly popular in many parts of the world. Direct Broadcasting Satellite (DBS) systems transmit television programming content, for example, to a geo-synchronous satellite, which broadcasts the content back to the customers. In such a wireless broadcast environment, the transmitted programming can be received by anyone with an appropriate receiver, such as an antenna or a satellite dish.

In addition, a number of satellite broadcasting systems have been proposed or suggested for broadcasting audio programming content from geo-synchronous satellites to customers in a large coverage area, such as the continental United States. Satellite broadcasting systems for television and radio content provide potentially national coverage areas, and thus improve over conventional terrestrial television stations and AM/FM radio stations that provide only regional coverage.

Code Division Multiple Access techniques have been proposed for satellite broadcasting systems to permit a number of programming channels to be transmitted on the same carrier frequency. Code Division Multiple Access techniques transmit multiple information signals on the same carrier frequency, and differentiate each programming channel by encoding the channel with a unique orthogonal code.

CD Radio Incorporated has proposed a satellite broadcasting system having two satellites and a group of repeaters to provide audio service. The CD Radio system is described, for example, in U.S. Pat. Nos. 5,278,863, 5,319,673, 5,485,485 and 5,592,471. In a developed area, the direct line of sight (LOS) between a mobile receiver and the transmitters on the satellites and repeaters can be blocked, for example, by underpasses or other structures. Thus, many satellite broadcasting systems transmit a delayed version of each program channel with the on-time version of the program channel to permit uninterrupted reception in the event of a blockage. U.S. patent application Ser. No. 09/220,722, filed Dec. 24, 1998, a parent application to the present patent application, discloses a code division multiplex (CDM) satellite broadcasting systems that transmits both the on-time and delayed versions of each program channel transmitted from the same satellite.

In digital broadcasting applications, feedback or retransmission of lost symbols or packets are not desirable solutions, because of the nature of the broadcasting environment. Thus, forward error correction schemes, such as convolutional and block coding, have been used to combat fading or packet loss in a broadcast environment. Forward error correction schemes protect the transmitted signals so that even if part of a signal is received with error, the error may be corrected or minimized using other transmitted information that is received under more favorable conditions. Convolutional codes effectively reduce reception errors due to relatively slow fading, provided appropriate interleaving is also employed. Interleaving scrambles a signal over a certain time interval. In order for convolutional codes to work properly, consecutive symbols presented to a signal channel decoder at the receiver should be uncorrelated. For example, the consecutive symbols should be separated timewise from one another during transmission, such as occurs by interleaving.

If block-coded symbols are interleaved over the duration of many blocks before transmission, symbols associated with a lost packet will be de-interleaved by the receiver and found among many different coded blocks. Thus, the number of symbol errors that may occur in each coded block is reduced, and the likelihood that a selected block code will correct all symbol errors in a transmitted signal is correspondingly increased. A large interleaver length, however, results in large time delays when first tuning the receiver to a broadcast program, since decoding and reproduction of the original program content can start only after an entire interleaved packet has been buffered or stored at the receiver.

While a delay of as much as several seconds between signal reception and program reproduction at the receiver may go unnoticed by a user as long as the receiver remains tuned to one program, such delay can be intolerable when first tuning the receiver to select a program, or while re-tuning to select a different program. Then, delays of at most a fraction of a second may be tolerable. Thus, while large interleaver lengths help to ensure that a program source signal is transmitted, received, decoded and reproduced with minimum error due to fading and noise, the interleaver lengths must be relatively short if program decoding delays at the receiver are to be minimized while the receiver is being tuned or switched among different programs. U.S. patent application Ser. No. 09/203,663, filed Dec. 2, 1998, a parent application to the present patent application, discloses a technique that allows a receiver to reproduce a program source with minimal delay when the receiver is first tuned to the program source. Generally, a tuning channel is provided for each program channel that utilizes a shorter interleaver length than the corresponding primary program channel.

SUMMARY OF THE INVENTION

Generally, a CDM satellite transmission system is disclosed that broadcasts programming content, such as audio and video information, using one or more geo-synchronous satellites based on Code Division Multiple Access technology. The CDM satellite transmission system may optionally include one or more terrestrial repeaters. In order to account for signal loss due to short-term fading, the CDM satellite transmission system utilizes forward error correction coding and interleaving prior to broadcasting the signals over the CDM channel. A mobile receiver de-interleaves the received signals over a corresponding interval, and applies the de-interleaved signal to a channel decoder.

According to one aspect of the invention, the CDM satellite transmission system provides a tuning channel corresponding to each program channel that reduces the delay when a mobile receiver is first tuned to a selected program channel. The tuning channel utilizes a shorter interleaver length, if any, than the corresponding primary program channel. As used herein, a "tuning channel" is a channel that transmits at least a portion of the corresponding primary program channel using a shorter interleaver delay, if any, than the corresponding primary program channel. Thus, the present invention improves on conventional techniques that require a mobile receiver to wait for a period corresponding to the interleaver length before the receiver can decode a received signal, resulting in a delay equal to at least the interleaver length each time a new program is selected, before the new program can be reproduced.

In an illustrative embodiment, the CDM satellite transmission system transmits a four (4) second delayed version of a program signal with the on-time version of the audio output to accommodate uninterrupted reception in the event of such a blockage. Generally, the on-time and delayed signals attempt to provide time diversity over a period longer than the period in which the received signal is lost. The on-time version of the audio output is transmitted by a first satellite, while delayed version of the audio output is transmitted by a second satellite.

In one implementation of the invention, the core layer, $C(n)$, of a scalable audio coding scheme is utilized as the tuning channel. While the core layer, $C(n)$, is independently decodable, the enhancement layers, $E(n)$, provide a higher quality reproduction when decoded. Thus, a "core" reproduction of the program may be readily reproduced for purposes of tuning and program selection by a user of the CDM satellite transmission system.

Furthermore, in the illustrative embodiment, the core layer, $C_2(n)$, of the delayed version of the audio output is used as the tuning channel. While the core layer, $C_1(n)$, and enhancement layers, $E_1(n)$, of the on-time signal and the enhancement layers, $E_2(n)$, of the delayed-time signal employ a block interleaver having a duration of four seconds, the core layer, $C_2(n)$, of the delayed-time signal, which is the tuning channel, employs a block interleaver having a duration of 500 milliseconds.

A more complete understanding of the present invention, as well as further features and advantages of the present invention, will be obtained by reference to the following detailed description and drawings.

DETAILED DESCRIPTION

Figure 1:
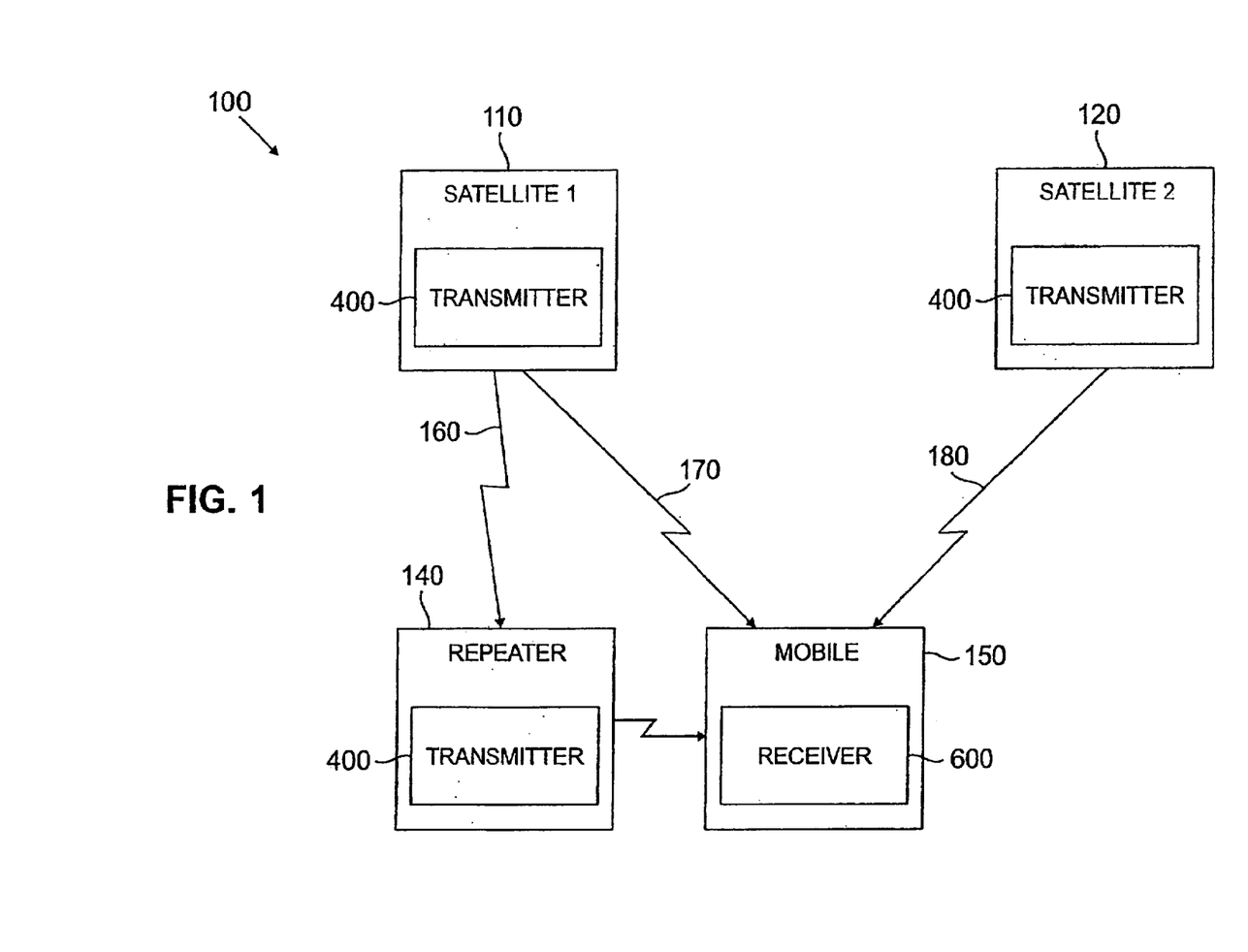
FIG. 1 illustrates a CDM satellite transmission system in accordance with the present invention.

FIG. 1 illustrates a CDM satellite transmission system 100 in accordance with the present invention. The CDM satellite transmission system 100 transmits digital music and other audio information from an uplink station (not shown) to one or more mobile receivers, such as the mobile receiver 150. A plurality of audio channels are multiplexed onto a carrier frequency using Code Division Multiple Access technology. The term Code Division Multiplexing is used herein, since the satellite transmission system 100 operates in a broadcast mode. A maximum bit error rate of $10^{-5}$ is generally desirable for compact disk quality music.

As shown in FIG. 1, the illustrative CDM satellite transmission system 100 includes two satellites 110, 120 operating in a broadcast mode. The satellites 110, 120 are designed to be geo-synchronous, and are located over a desired geographical coverage area, such as over the eastern and western United States, at appropriate angles of elevation, as dictated by the requirements of a geo-synchronous system. In addition, the illustrative CDM satellite transmission system 100 optionally includes a plurality of terrestrial repeaters, such as the terrestrial repeater 140, discussed below, that will operate in dense urban areas, where the direct line of sight between the satellites 110, 120 and the mobile receiver 150, can be blocked due to the angle of elevation and shadowing by tall buildings. The link between each repeater 140 and at least one satellite 110, 120 is designed to be line of sight. The terrestrial repeaters 140 retrieve the information from the satellite, or directly from the studio, by well-known technical means, such as wireline or microwave links. It is noted, however, that the present invention can be implemented in a CDM satellite transmission system 100 that includes only a single satellite, such as the satellite 120, as would be apparent to a person of ordinary skill in the art.

The direct line of sight between the mobile receiver 150 and one or both satellites 110, 120 and the repeater 140 in the illustrative embodiment can be blocked by underpasses or other structures. It has been observed that blockages will generally not last longer than one or two seconds. Thus, the CDM satellite transmission system 100 may transmit a four (4) second delayed version of the signal with the on-time version of the audio output to accommodate uninterrupted reception in the event of such a blockage. Generally, the on-time and delayed signals attempt to provide time diversity over a period longer than the period in which the received signal is lost. The receiver decodes and combines both the on-time and delayed channels. In the illustrative embodiment, one satellite, such as satellite 110, transmits the on-time version of the audio output, while the other satellite, such as satellite 120, transmits the delayed version of the audio output.

As discussed further below, the CDM satellite transmission system 100 utilizes forward error correction coding and interleaving prior to broadcasting the on-time and delayed signals over the CDM channel. The mobile receiver 150 de-interleaves the received signals over a corresponding interval, and applies the de-interleaved signal to a channel decoder. Interleaving both the on-time and delayed signals accounts for short-term fades.

As previously indicated, if the illustrative interleaver length is four seconds, the mobile receiver 150 must wait for a corresponding four seconds for the de-interleaver to output de-interleaved symbols before the mobile receiver 150 can decode them. As previously indicated, when a conventional mobile receiver first tunes to a program, or switches from one program to another, the four second de-interleaver must be filled before decoding can begin. Thus, the user must wait at least four seconds each time a new program is selected, before the new program is reproduced.

According to a feature of the present invention, the CDM satellite transmission system 100 provides a tuning channel for each program channel that reduces the delay when a mobile receiver 150 is first tuned to the program channel. As discussed further below, the tuning channel utilizes a shorter interleaver length, if any, than the corresponding primary program channel. As used herein, a "tuning channel" is a channel that transmits at least a portion of the corresponding primary program channel using a shorter interleaver delay, if any, than the corresponding primary program channel.

The satellites 110, 120 receive the broadcast signal from a studio, for example, over a robust radio frequency (RF) link, and the satellites 110, 120 will broadcast the signal after down-converting the signal to the carrier frequency. The terrestrial repeaters 140 retrieve the information from the satellite, or directly from the studio, by well-known technical means, such as wireline or microwave links. The satellites 110, 120 and the terrestrial repeaters 140 broadcast the signal using the same or similar transmitter 400, discussed below in conjunction with FIG. 4, and multiplexing technology.

Figure 2:
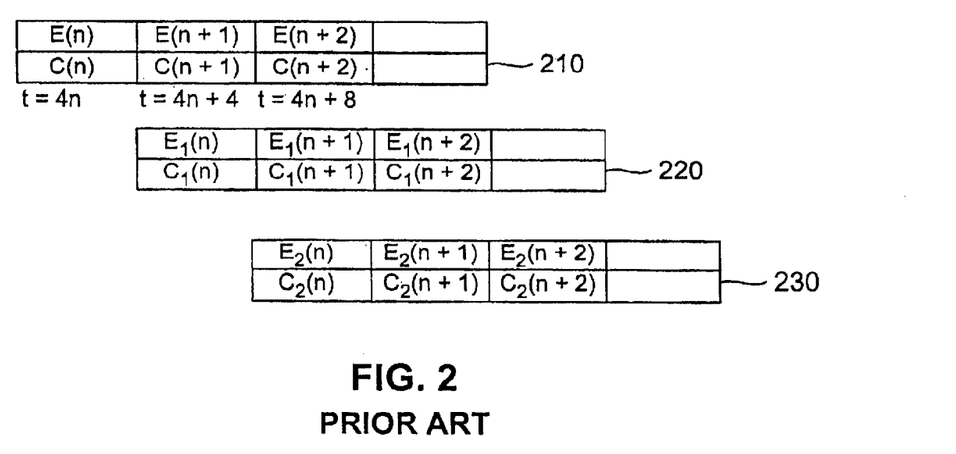
FIG. 2 illustrates the transmission times for the on-time and delayed signal paths for a conventional CDM satellite transmission system.

Although the present invention does not require the use of any particular coding scheme, a representative scalable audio coding scheme is described in J. Herra et al., "The Integrated Filterbank Based Scalable MPEG-4 Audio Coder," 105$^{th}$ Audio Engineering Society (AES) Convention (September 1998), incorporated by reference herein. As shown in FIG. 2, in such a scalable audio coding scheme there is a core layer, C(n), and one or more enhancement layers, E(n). While the core layer, C(n), is independently decodable, the enhancement layers, E(n), provide a higher quality reproduction when decoded. In one implementation of the invention, the core layer, C(n), is used as the tuning channel. Thus, a "core" reproduction of the program may be readily reproduced for purposes of tuning and program selection by a user of the CDM satellite transmission system 100. In the illustrative embodiment, the audio coder rate is assumed to be 96 kilo-bits-per-second, with 32 kilo-bits-per-second allocated to the core layer, C(n), and 64 kilo-bits-per-second allocated to the enhancement layer.

FIG. 2 illustrates the transmission times for the on-time and delayed signal paths. As shown in FIG. 2, the signal consists of four second blocks of data, with C(n) and E(n) representing the channel coded core and enhancement layer data at the n-th four second block. The signal 210 corresponds to the core and enhancement layer blocks before the interleaver stage. The signal 220 corresponds to the interleaved on-time signal and the signal 230 corresponds to the interleaved delayed-time signal. It is noted that the on-time signal 220 and the delayed signal 230 can each be transmitted by one or both satellites 110, 120, as would be apparent to a person of ordinary skill in the art. As indicated above, in the illustrative embodiment, one satellite, such as satellite 110, transmits the on-time version of the audio output 220, while the other satellite, such as satellite 120, transmits the delayed version of the audio output 230. Further, the core layer, $C_2(n)$, of the delayed version of the audio output 230 is used as the tuning channel. Thus, the core layer, $C_1(n)$, and enhancement layers, $E_1(n)$, of the on-time signal 220 and the enhancement layers, $E_2(n)$, of the delayed-time signal 230 employ a block interleaver having a duration of four seconds. The core layer, $C_2(n)$, of the delayed-time signal 230, which is the tuning channel, employs a block interleaver having a duration of 500 milliseconds.

The on-time signal 220, $C_1(n)$ and $E_1$, (n), is obtained by interleaving C(n) and E(n) over a four second period and is transmitted during the time period {4n+4, 4n+8}. The delayed signal 230, $C_2(n)$ and $E_2(n)$, is obtained by interleaving C(n) and E(n) over a four second period and is transmitted during the time period {4n+8, 4n+12}. At the receiver, at a time equal to {4n+12}, the de-interleaved output from the delayed-time signal path corresponding to $C_2(n)$ and $E_2(n)$ is combined with the de-interleaved output from the on-time signal path corresponding to $C_1(n)$ and $E_1(n)$. It is noted that $C_1(n)$ and $E_1(n)$ are the on-time components and the de-interleaved output from them are available at a time equal to {4n+8}. This combined signal is then fed to the channel decoders for the core and enhancement layers.

In the case of a loss of signal due to an underpass in the time interval {4n+4, 4n+8}, the signal loss affects $C_1(n)$, $E_1(n)$, $C_2(n-1)$ and $E_2(n-1)$. However, since $C_2(n)$, $E_2(n)$, $C_1(n-1)$ and $E_1(n-1)$ are not affected, this conventional interleaving scheme performs satisfactorily.

As previously indicated, the illustrative interleavers used to generate the signals 220, 230 of FIG. 2 are four seconds long. Thus, the de-interleaving delay at the receiver is at least four seconds. When a user changes the audio channel, the receiver has to buffer incoming data for at least four seconds which gives rise to a minimum tuning delay of four seconds. For example, if a user changes the audio channel at a time of {4n+9} (FIG. 2), the received data corresponding to the new channel cannot be used in the interval {4n+9, 4n+12}. During the interval {4n+12, 4n+16}, $C_1(n+2)$ and $E_1(n+2)$ from the on-time path and $C_2(n+1)$ and $E_2(n+1)$ from the delayed-time path are stored in the receiver. Next, for the time interval {4n+16, 4n+20}, the delayed time signal $C_2(n+1)$ and $E_2(n+1)$ can be decoded and played at the audio output. It is noted that the combined signal from both on-time and delayed time paths will be available only at a time equal to {4n+20}. Thus, although a channel change was request at a time of {4n+9}, a signal can be provided using conventional methods only at a time equal to {4n+16}.

Figure 3:
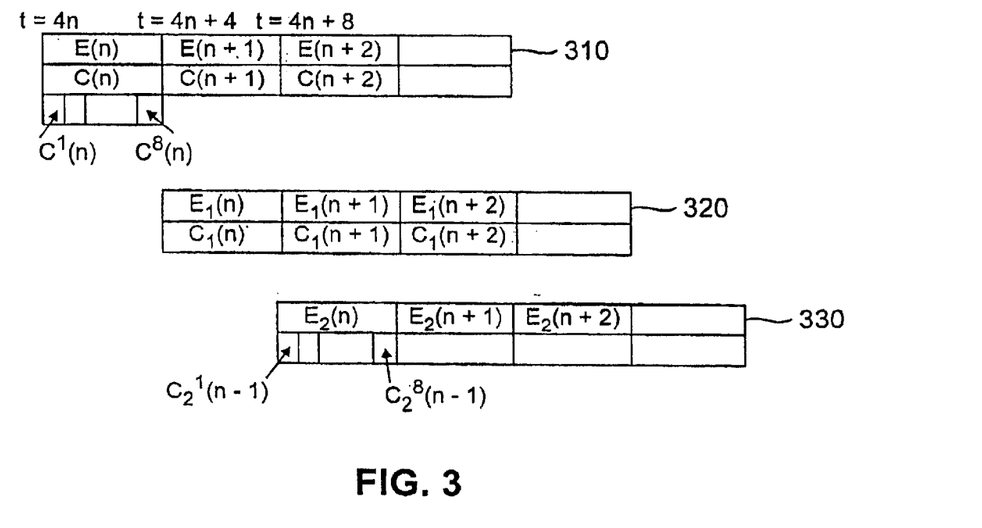
FIG. 3 illustrates the transmission times for the on-time and delayed signal paths with a tuning channel in accordance with the present invention.

FIG. 3 illustrates the interleaving scheme with a tuning channel in accordance with the present invention. The signal 310 corresponds to the core and enhancement layer blocks before the interleaver stage. The signal 320 corresponds to the interleaved on-time signal and the signal 330 corresponds to the interleaved delayed-time signal. Since only the core layer, $C_2(n)$, of the delayed version of the audio output 330 is used as the tuning channel in the illustrative embodiment, the on-time signal 320 is the same as with the conventional interleaving scheme of FIG. 2. The core layer, $C_2(n)$, of the delayed version of the audio output 330 is interleaved over a shorter interleaver delay, such as 500 milliseconds, rather than the four second interleaver delay used for the primary channels. In FIG. 3, $C^i(n)$ denotes the block of channel coded core layer data in the time interval {4n+0.5(i−1), 4n+0.5i}, where i is an integer between one and eight. At a time equal to {4n+12}, the on-time components, $C_1(n)$ and $E_1(n)$, and $E_2(n)$ from the delayed path are available at the receiver. Thus, at a time equal to {4n+12}, the enhancement layers, $E_1(n)$ and $E_2(n)$, can be combined and applied to the channel decoder. However, the corresponding core layer data, $C_2(n)$, from the delayed time path 330 will be available only in the following four second duration. At a time equal to {4n+12+0.5i}, $C^i_2(n)$ is de-interleaved and combined with the data stream corresponding to $C^i_1(n)$ from the on-time path 320 and this combined signal is applied to the channel decoder for the core layer data.

If a user changes a channel at a time equal to {4n+9}, after 500 milliseconds, the core layer in the delayed-time path, $C^3_2(n-1)$, is available to the channel decoder. It is again noted that the tuning channel contains only the core layer data. At a time equal to {4n+12}, the receiver begins buffering $C_1(n+2)$, $E_1(n+2)$ and $E_2(n+1)$. The tuning channel data is the only available decoded data until a time equal to {4n+16}. For the time interval {4n+16+0.5, 4n+20} the core and the enhancement layers, $C_2(n+1)$ and $E_2(n+1)$, from the delayed-time path are available and, finally, at a time equal to {4n+20+0.5} all the layers are available to the channel decoder. Thus, the present invention provides an effective tuning channel with the tuning delay varying from 500 milliseconds to one second.

Figure 4:
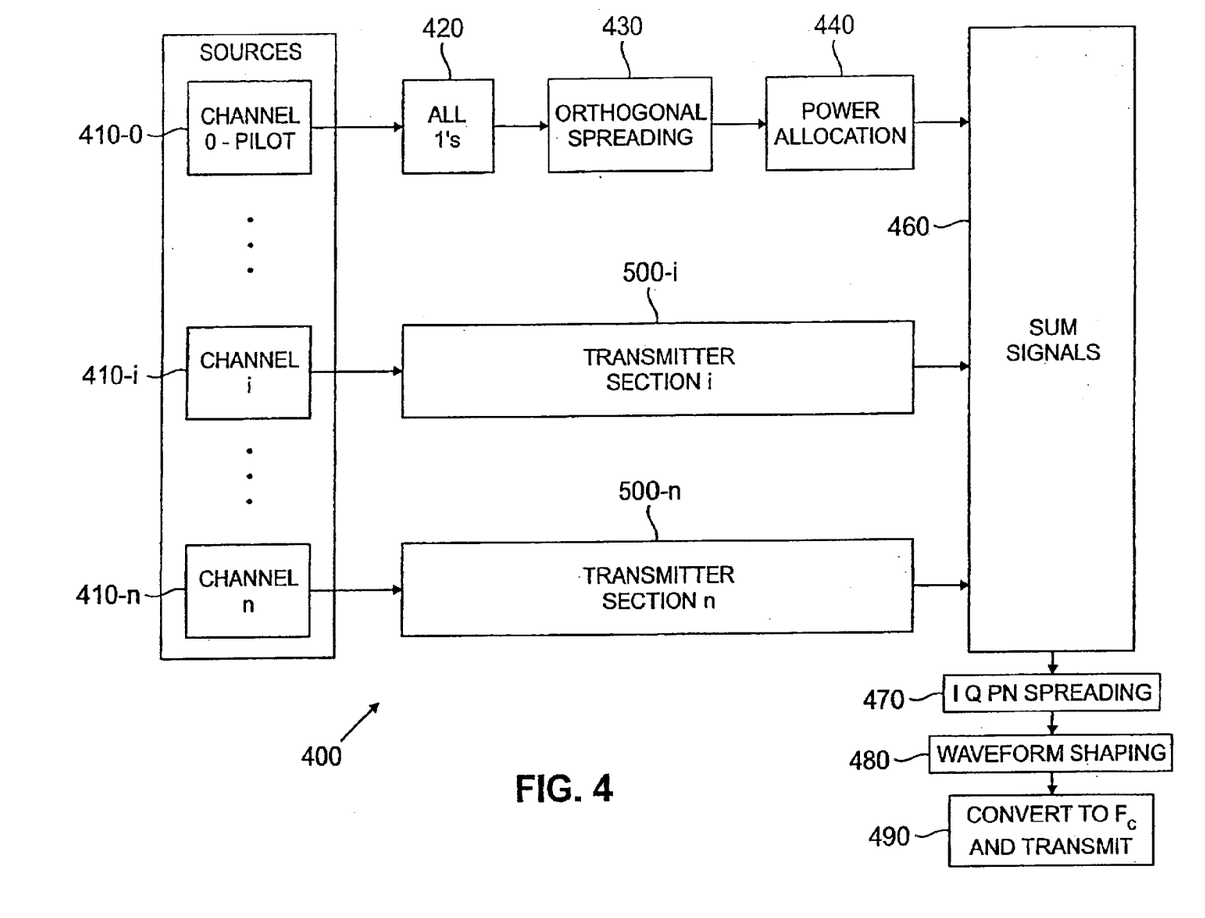
FIG. 4 illustrates the transmitter of FIG. 1.

As shown in FIG. 4, each transmitter 400 includes n+1 sources 410-0 through 410-n for providing n information channels. The zero-th channel is reserved for the pilot signal in the illustrative embodiment. The pilot channel allows a mobile station to acquire the timing of the Forward CDM Channel after a mobile receiver 150 is initially turned on ("initial pilot detection"). In addition, the pilot channel enhances the overall signal quality by providing a phase reference for coherent demodulation ("continuous pilot detection"). The pilot channel is unmodulated, all 1's and is assigned the orthogonal code "0" which is also the one sequence, in accordance with IS-95.

The pilot signal is encoded with an orthogonal code 430. The length of the orthogonal code 430 may be determined based on the number of on-time and delayed channels to be transmitted. The length of the orthogonal code 430 need not be a power of two. For a detailed description of a spread spectrum system that utilizes orthogonal codes having lengths that are not a power-of-2, see U.S. patent application Ser. No. 09/184,613, filed Nov. 2, 1998, entitled "A Method And Apparatus For Achieving Channel Variability In Spread Spectrum Communication Systems," assigned to the assignee of the present invention and incorporated by reference herein.

Thereafter, the transmitter allocates the available power 440, among the pilot channel and the audio channels. In one embodiment, each information source 410-1 through 410-n is encoded using a perceptual audio coder (PAC), such as those described in U.S. Pat. No. 5,732,189, assigned to the assignee of the present invention and incorporated by reference herein. In one implementation, the audio coders 410-1 through 410-n output digital information at 96 kilo-bits-per-second. Thereafter, each audio channel is processed by a corresponding transmitter section 500, such as the transmitter section 500-i, corresponding to the i-th branch of the transmitter 400. The transmitter section 500 is discussed below in conjunction with FIG. 5.

The spread signal outputs of each transmitter section 500 are summed by a signal summer 460, before psuedo-noise spreading 470 is performed in quadrature and in-phase (IQ). Waveform shaping is performed at stage 480 using 12.5 MHz of bandwidth in the illustrative embodiment, with appropriate Nyquist rolloff, before the signals are converted to the carrier frequency, $F_C$, and transmitted at stage 490. It is noted that if some of the channels are known to contain only speech, then the human voice activity factor can be utilized to lower the power level of the speech channels, and increase the CDM link capacity.

Figure 5:
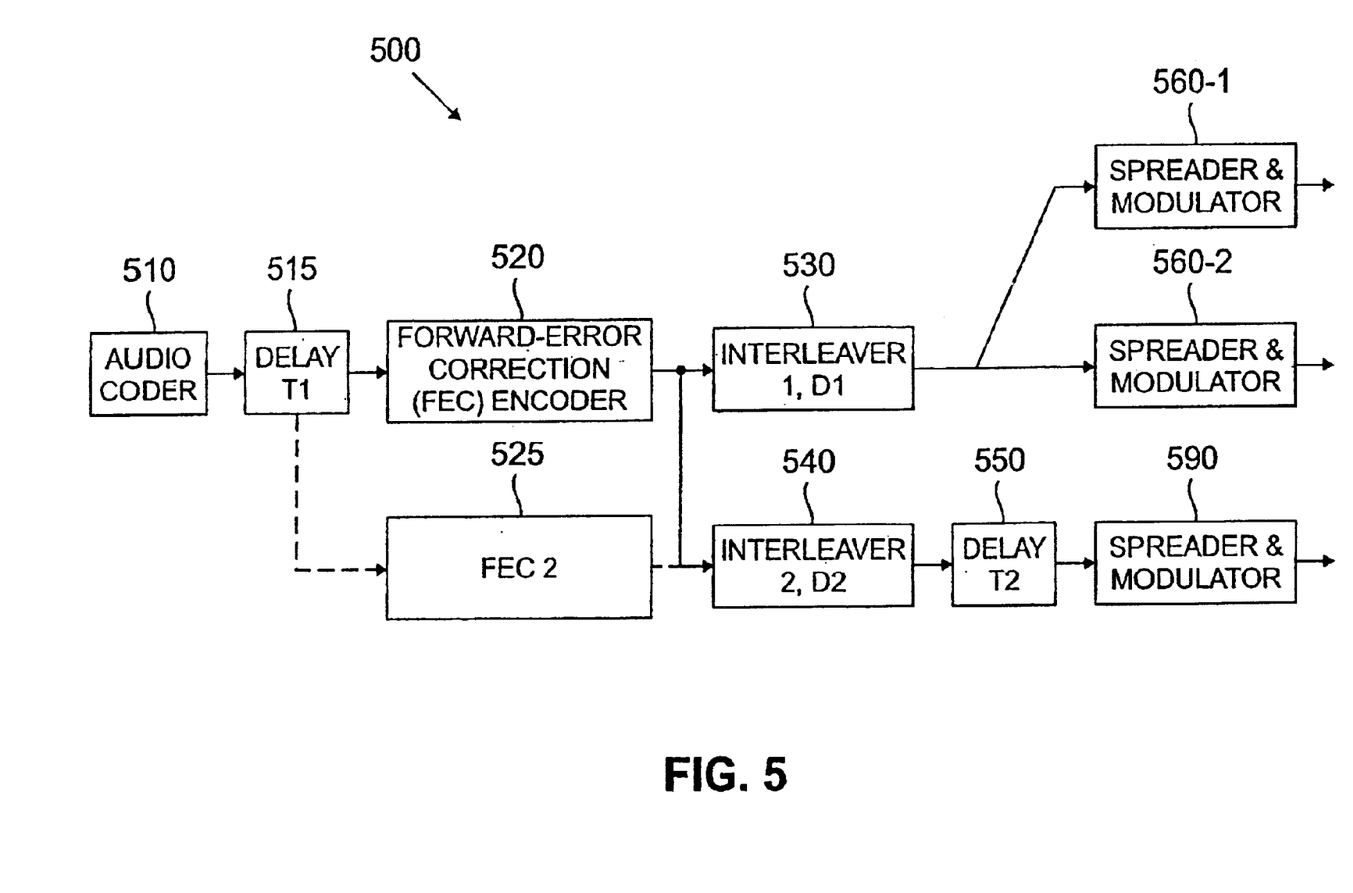
FIG. 5 illustrates a parallel implementation of the transmitter section of FIG. 4.

A parallel implementation of a transmitter section 500 is shown in FIG. 5. As previously indicated, the core layer, $C_2(n)$, of the delayed version of the audio output 230 is used as the tuning channel in the illustrative embodiment. Thus, while the transmitter section 500 includes a primary path for encoding and transmitting the primary program channel and a tuning channel, the tuning channel may be disabled for the transmitted associated with the on-time version of the audio output 220.

As shown in FIG. 5, the transmitter section 500 includes an audio coder 510, which may be, for example, the scalable audio coding scheme described by J. Herra et al. and incorporated above. The transmitter section 500 includes a delay stage 515 that is configured to introduce a delay of T1. If the transmitter section 500 is producing the delayed version of the program source, (satellite 120 in the illustrative embodiment) the value of T1 is set to four (4) seconds. If the transmitter section 500 is producing the on-time version of the program source, (satellite 110 in the illustrative embodiment) the value of T1 is set to zero.

The audio coded signal is applied to an input of a forward error correction (FEC) encoder 520 that applies, for example, a known rate ½ convolutional block code to allow recovery of bits or symbols that may be lost due to noise bursts. Thus, if the audio coded signal is 96 kilo-bits-per-second, the output of the FEC encoder 520 will be 192 kilo-bits-per-second. The coded signal output by the forward error correction encoder 520 is applied to an input of a first interleaver 530 on the primary channel. The first interleaver 530 is configured to scramble consecutive signal bits or symbols of the coded signal stream over a first delay interval or length, D1, to overcome expected effects of signal fading when the signals are broadcast over a given transmission channel. In the illustrative embodiment, the value of D1 is four (4) seconds for both satellites 110, 120.

The signal produced by the first interleaver 530 is then encoded with an orthogonal spreading code and modulated at stage 560. Again, the length of the orthogonal codes need not be a power of two. For a detailed description of a spread spectrum system that utilizes orthogonal codes having lengths that are not a power-of 2, see U.S. patent application Ser. No. 09/184,613, filed Nov. 2, 1998, entitled "A Method And Apparatus For Achieving Channel Variability In Spread Spectrum Communication Systems," assigned to the assignee of the present invention and incorporated by reference herein.

The coded signal output by the forward error correction encoder 520 is also applied to an input of a second interleaver 540 on the tuning channel. As shown in FIG. 5, a second forward error correction encoder 525 may be optionally utilized in an alternate implementation to provide a different error correction scheme for the tuning channel. In accordance with the present invention, the second interleaver 540 on the tuning channel has a second delay interval or interleaver length, D2, that is shorter than that of the first interleaver 530 on the primary channel. Thus, if the transmitter section 500 is producing the delayed version of the program source, and likewise the tuning channel (satellite 120 in the illustrative embodiment) the value of D2 is set to 500 milliseconds. If, however, the transmitter section 500 is producing the on-time version of the program source, and thus does not include a tuning channel (satellite 110 in the illustrative embodiment) the value of D2 is set to four (4) seconds (transmitting the core layer with an interleaver length of four seconds).

Signals output from the second interleaver 540 are input to a signal delay stage 550. The delay stage 550 is configured to introduce a time delay, T2, to the tuning channel that is substantially equal to the length of the first interleaver 530. Thus, in the illustrative embodiment, the delay introduced by the delay stage 550 if the transmitter section 500 is transmitting the tuning channel (satellite 120) is approximately 7.5 seconds (4 seconds minus 500 milliseconds to synchronize plus four second offset from enhancement layer). The value of T2 if the transmitter section 500 is transmitting the on-time signal (satellite 110) is zero. The tuning channel facilitates reproduction of the program source at the receiver when the CDM satellite transmission system 100 is first tuned to the program source.

The delayed signal produced by the second interleaver 540 is then encoded with an orthogonal spreading code and modulated at stage 590. In the illustrative embodiment, where the interleaved, coded 64 Kbps core layer, $C_2(n)$, of the delayed version of the audio output 230 is used as the tuning channel, the spreader and modulator stage 590 encodes with a data rate of 64 Kbps.

In the parallel transmitter section shown in FIG. 5, a plurality of spreader and modulator stages 560-n are utilized on the primary channel. In the illustrative embodiment, the interleaved, coded signal that is generated by the interleaver 530 has a rate of 128 kilo-bits-per-second allocated to the enhancement layer. The parallel transmitter shown in FIG. 5 includes two spreader and modulator stages 560-1 and 560-2, that each encode with a data rate of 64 Kbps. Thus, a multicode approach is implemented, where the 64 kilo-bits-per-second audio input channel is split into two 32 kilo-bits-per-second audio sub-channels 560-1 and 560-2, with a separate signature sequence (orthogonal spreading code) assigned to each sub-channel. Each of the spreader and modulator stages 560-n are associated with the enhancement layer. It is noted that the 64 Kbps of coded data for the core layer is transmitted on the tuning channel: using a four second interleaver for the on-time signal and a 500 millisecond interleaver for the delayed signal. In this manner, each of the spreader and modulator stages 560-n for the primary channel and the spreader and modulator stage 590 for the tuning channel have the same length.

Figure 6:
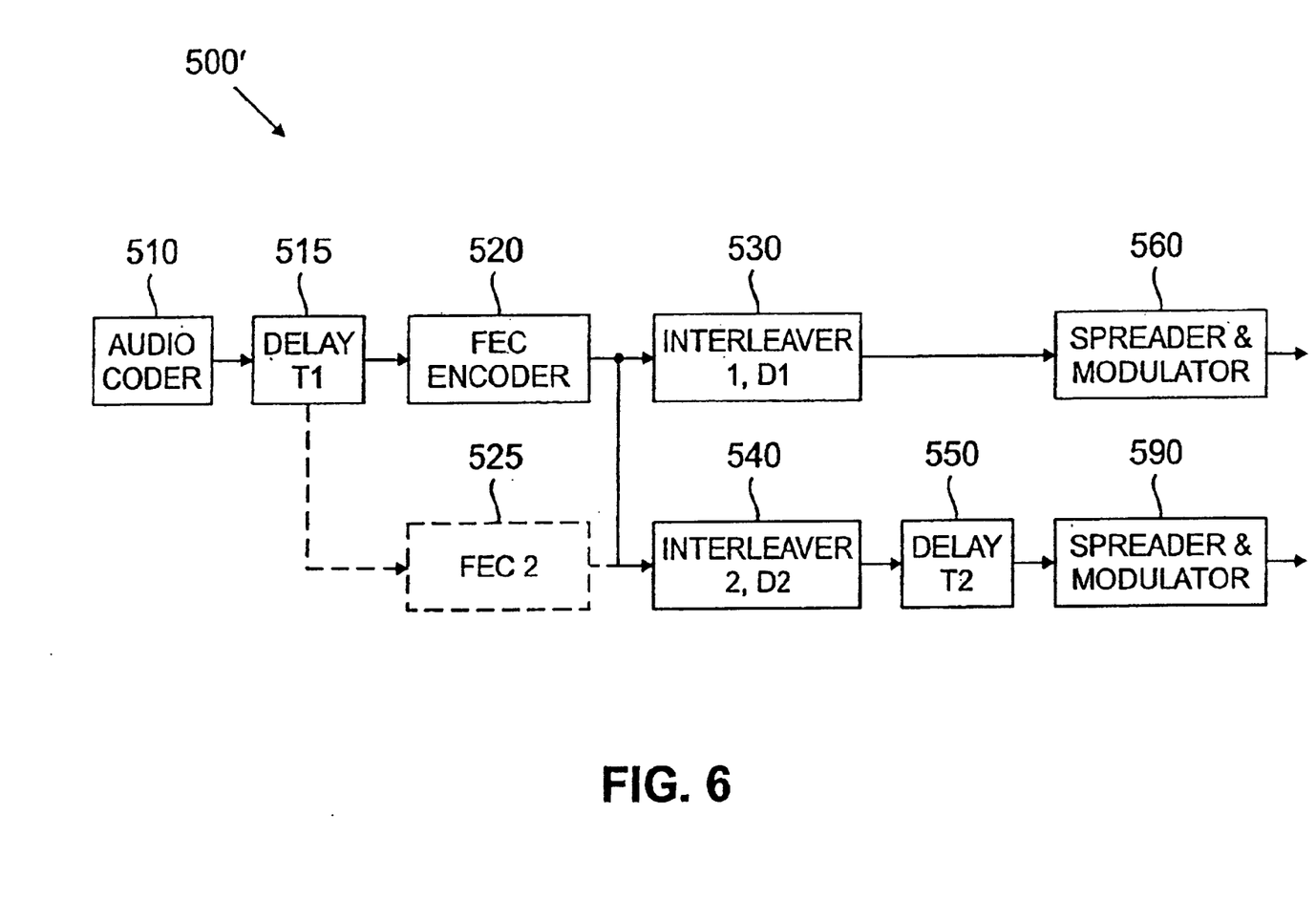
FIG. 6 illustrates a serial implementation of the transmitter section of FIG. 4.

A serial implementation of a transmitter section 500' is shown in FIG. 6. Each of the components shown in FIG. 6 may function identically to those corresponding components described above in conjunction with FIG. 5. In the serial transmitter section shown in FIG. 6, a single spreader and modulator stage 560 is utilized on the primary channel. In the illustrative embodiment, the interleaved, coded signal generated by the interleaver 530 has a rate of 128 kilo-bits-per-second for the enhancement layer and an additional 64 Kbps allocated to the core layer. The serial transmitter shown in FIG. 5 includes one spreader and modulator stage 560, that encodes the enhancement layer with a data rate of 128 Kbps.

Figure 7:
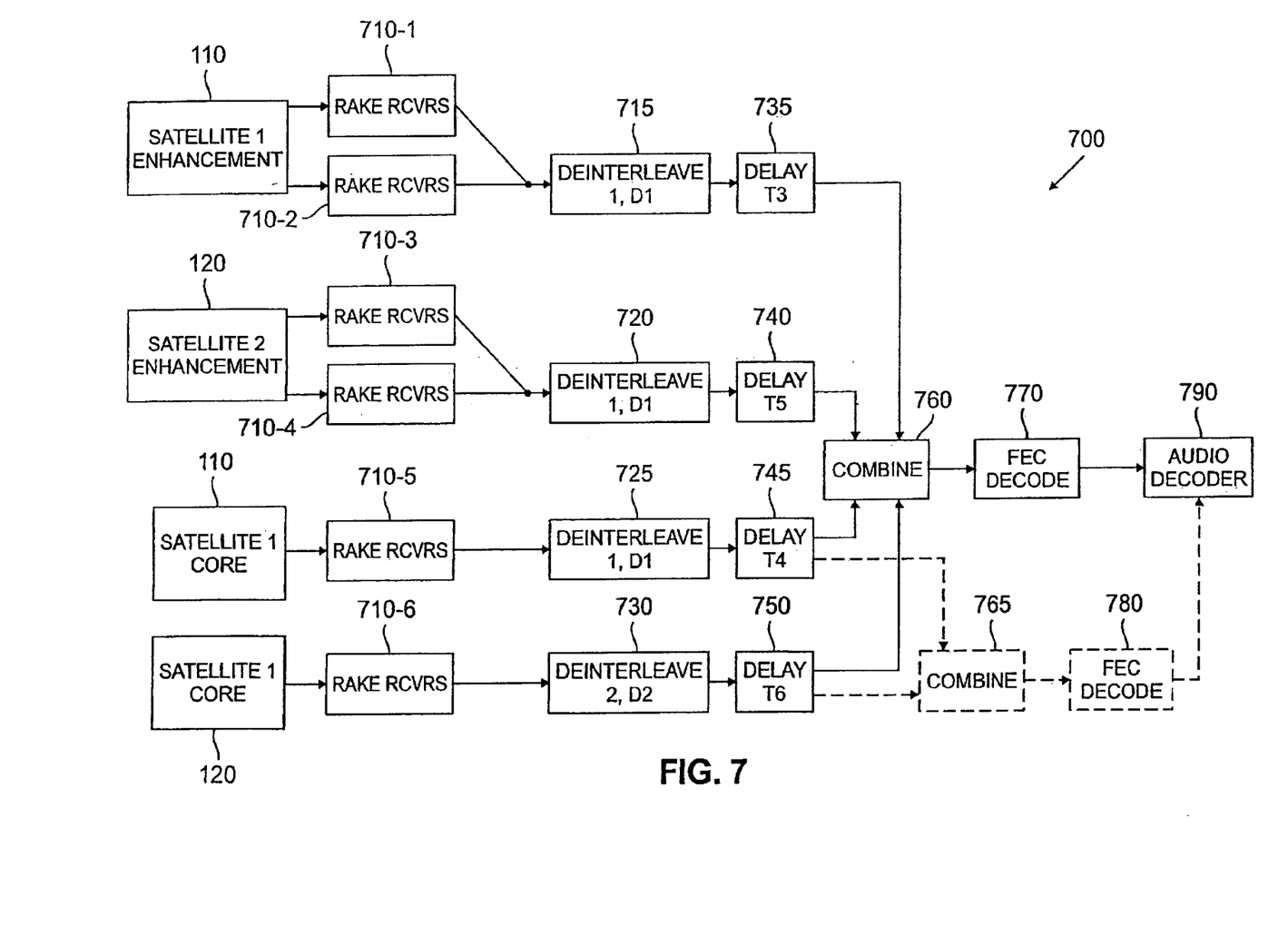
FIG. 7 illustrates a parallel implementation of the receiver of FIG. 1.
Figure 8:
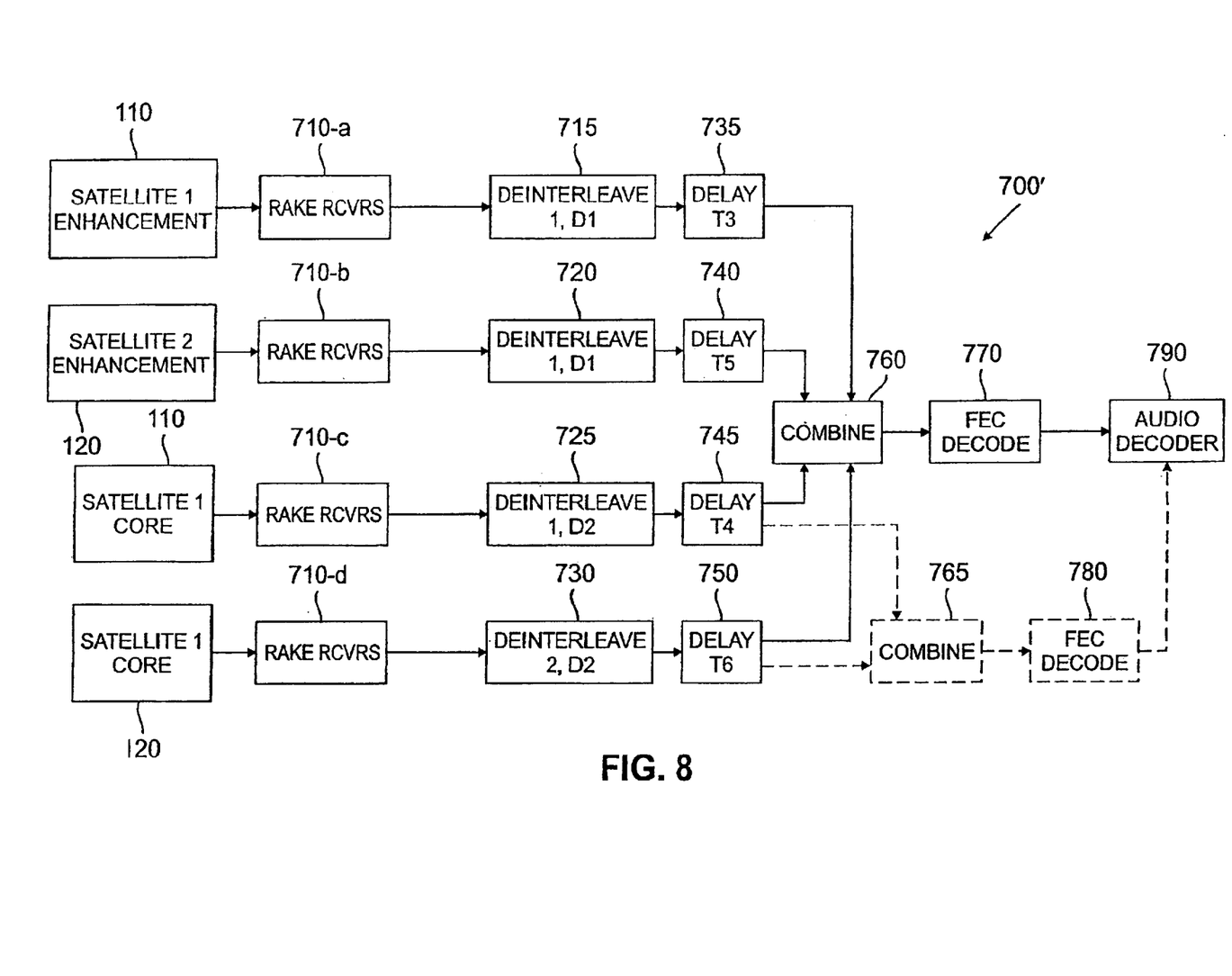
FIG. 8 illustrates a serial implementation of the receiver of FIG. 1.

Parallel and serial versions of the receiver 700 for the CDM satellite transmission system 100 are shown in FIGS. 7 and 8, respectively. As shown in FIG. 7, the received signal (converted to a digital signal by an analog-to-digital converter) is applied to a bank of rake receivers 710-n in the parallel implementation. The rake receivers 710-n each provide a bank of fingers, with each finger having on-time, delayed and pilot processing. Thus, the rake receivers 710-n include composite fingers that can track the on-time and delayed versions of the same primary channel. The rake receiver 710-6 (710-d in the serial implementation) includes a composite finger that can track the tuning channel.

The received signal corresponding to satellite two (120) is received by rake receivers 710-3 (enhancement), 710-4 (enhancement) and 710-6 (core-tuning). The enhancement layer is then de-interleaved at stage 720, using the same interleaver delay, D1, as the first interleaver 530 (four seconds). The de-interleaver is configured to unscramble signal bits or symbols that were scrambled over the first delay interval, to overcome signal losses due to fading over the transmission channel. The delay 740 is utilized to synchronize the primary (enhancement) and tuning (core) channels, and is configured to introduce a time delay, T5. Thus, in the illustrative embodiment, the delay, T5, introduced by the delay stage 740 is approximately 500 milliseconds. The core layer from satellite two (120) is then de-interleaved at stage 730, using an interleaver delay, D2, of 500 milliseconds. The output of the interleaver 730 then bypasses a delay stage 750 having a delay, T6, set to zero seconds.

The received signal corresponding to satellite one (110) is received by rake receivers 710-1 (enhancement), 710-2 (enhancement) and 710-5 (core-tuning). The enhancement layer is then de-interleaved at stage 715, using the same interleaver delay, D1, as the first interleaver 530 (four seconds). The delay 735 is utilized to synchronize the enhancement and core channels of both satellites 110, 120, and is configured to introduce a time delay, T3. Thus, in the illustrative embodiment, the delay, T3, introduced by the delay stage 735 is approximately 4.5 seconds. The core layer from satellite one (110) is then de-interleaved at stage 725, using an interleaver delay, D1, of four seconds. The output of the interleaver 725 is then delayed at stage 745 having a delay, T4, set to 4.5 seconds.

Following delay stages 735, 740, 745 and 750 the de-interleaved signals are all now properly aligned to account for the four second time shift between the on-time and delayed signals, as well as the delays introduced by the tuning channel. Thus, the outputs of the delay stages 735, 740, 745 and 750 are combined at stage 760 (or 765 in an embodiment utilizing a second FEC coder 780 for the core layer). A decoder 770 decodes the input signals according to the coding scheme used by the first FEC coder 520 of the transmitter section 500.

The FEC decoded signal is then applied to an audio/source decoder 790. If the receiver is at a steady state, e.g., set at one channel position for more than a predetermined time interval, the audio/source decoder 790 responds to the output of the primary channel only, or in combination with the output of the tuning channel. If the user selects a new channel, the audio/source decoder 790 is configured to respond only to the tuning channel. The program is then reproduced based only on information from the tuning channel, and the program reproduction delay is reduced to 500 milliseconds. In this manner, the user is able to obtain a reproduction of the program with minimal delay when tuning or switching among program channels. After a desired program is tuned and reproduced, the audio/source decoder 790 gradually resumes reproduction of the output of the enhancement layer, as the corresponding enhancement layer data becomes available.

Satellite CDM System

The transmitted signal from a satellite 110, 120, $S_i$, is given by:

$$s_i(t) = \sum_{k=0}^{3K} A_{ik} c_{ik}(t) b_{ik}(t) e^{j2\pi f_{c_i} t} \qquad \text{Eq.(1)}$$

where $A_{ik}$ is the amplitude of the k-$^{th}$ sub-channel, K is the number of audio channels, $c_{ik}$ is the signature code sequence for the k-$^{th}$ channel and the i-th satellite, and $b_{ik}$ is the complex QPSK symbol for each sub-channel. Thus, in accordance with the present invention, amplitude of the k-$^{th}$ sub-channel, $A_{ik}$, can be specified on a per-sub-channel basis. In this manner, more power can be allocated for more important sub-channels. For example, within an audio program it may be desirable to emphasize the core layer for tuning purposes.

The received signal is given by:

$$r(t) = \sum_{i=1,2} \sum_{t} \sum_{k=0}^{3K} g_i h_{il}(t) A_{ik} c_{ik}(t-\tau_{il}) b_{ik}(t-\tau_{il}) e^{j\psi_i t} + v(t) \quad \text{Eq.(2)}$$

where $\tau_{il}$ is the multipath delay for the l-th path from the i-th satellite, v(t) with $E\{v(t)v^*(t+\tau)\}=N_0\delta(\tau)$, is the additive white Gaussian noice (AWGN) introduced by the receiver and $\psi$ represents carrier frequency offsets, $g_i$ is the path gain, and $h_i(t)$ $(=\Sigma_l h_{il}(t-\tau_{il}))$ is the impulse response from satellite, $S_i$, to the mobile receiver 150.

The output of a multipath for the i-th satellite and the n-th multipath is given by:

$$\varepsilon_{im}(n) = \frac{1}{T} \int_{nT+\tau_{im}}^{nT+T+\tau_{im}} r(t) c_{il}^*(t-\tau_{im}) dt \quad \text{Eq.(3)}$$

where each path rake finger is tuned to a multipath. The corresponding pilot signal component for this rake branch is given by:

$$\eta_{im}(n) = \frac{1}{\Delta} \int_{nT+\tau_{im}-(\Delta-T)/2}^{nT+T+\tau_{im}+(\Delta-T)/2} r(t) c_{i0}^*(t-\tau_{im}) dt \quad \text{Eq.(4)}$$

where the rake is tuned to the pilot channel.

The pilot-aided demodulated and diversity combined signal at the output of the $(M_1+M_2)$-branch rake receiver is:

$$y_i(n) = \sum_{m \in M_i} \varepsilon_{im}(n) \eta_{im}^*(n), \, i = 1, 2 \quad \text{Eq.(5)}$$

where $M_i$ contains the indices corresponding to the $M_i$-largest values of $|h_{im}(n)|^2$.

It is noted that by using the pilot signal, a pilot-aided coherent demodulation technique is achieved that leads to maximal-ratio-like diversity combining of the on-time and delayed signals and also the two satellite transmissions. For a more detailed discussion of maximal-ratio diversity combining, see, for example, John G. Proakis, Digital Communications, 721–25 (2d ed, McGraw Hill, 1989). Thus, when there is only one path from each satellite, fourth ($4^{th}$) order diversity is achieved.

In a further embodiment, the mobile receiver 150 can employ dual receive antennas for the spatial filtering of the two satellite signals. This technology is referred to as "beam forming," and is described in R. T. Compton, Jr., Adaptive Antennas: Concepts and Performance (Prentice Hall, 1988). It is a well known result that two antenna elements can null one interfering source. In the present invention, when the signal received from one satellite is very good, the other satellite may appear as interference and the interference loss may exceed the diversity gain. In such case, the antenna pattern can be adaptively changed to pick up only one satellite signal and null out the other satellite signal.

In addition, rather than assigning equal power to all channels at all times, as described above, if some of the audio channels contain speech, such as talk radio, then the power can be adaptively allocated to those channels so that the capacity of the CDM system 100 can be maximized. During the periods when there is silence, the bit-rate of the source is low and the energy that is assigned to the talk channel can be lowered as well.

It is to be understood that the embodiments and variations shown and described herein are merely illustrative of the principles of this invention and that various modifications may be implemented by those skilled in the art without departing from the scope and spirit of the invention.

We claim:

1. A method for broadcasting a programming signal in a satellite broadcast system having one or more satellites, comprising the steps of:

interleaving said programming signal with a first interleaver producing a first interleaved signal having a first interleaver delay;

broadcasting said first interleaved signal on a carrier frequency using at least a first orthogonal code; and broadcasting a tuning signal corresponding to said programming signal, wherein said tuning signal utilizes a shorter interleaver length than said first interleaved signal.

2. The method of claim 1, wherein said tuning signal is produced by interleaving said programming signal with a second interleaver, said tuning signal having a second interleaver delay shorter than said first interleaver delay.

3. The method of claim 1, further comprising the step of broadcasting said tuning signal on said carrier frequency using a second orthogonal code.

4. The method of claim 1, further comprising the step of synchronizing said tuning signal to said first interleaved signal.

5. The method of claim 1, wherein said satellite broadcast system comprises at least two satellites and one satellite broadcasts said first interleaved signal and a second satellite broadcasts said tuning signal.

6. The method of claim 1, wherein said first interleaved signal and said tuning signal are broadcast from a single satellite.

7. The method of claim 1, further comprising the steps of:

interleaving said programming signal with a second interleaver producing a second interleaved signal having said first interleaver delay;

time-shifting said second interleaved signal relative to said first interleaved signal to produce on-time and delayed versions of said programming signal; and broadcasting said second interleaved signal using at least one orthogonal code.

8. The method of claim 7, wherein said satellite broadcast system comprises at least two satellites and one satellite broadcasts said on-time version of said programming signal and a second satellite broadcasts said delayed version of said programming signal.

9. The method of claim 7, wherein said on-time and delayed versions of said programming signal are broadcast from a single satellite.

10. The method of claim 1, wherein said programming signal is encoded using a scalable audio coding scheme that includes a core layer and one or more enhancement layers.

11. The method of claim 10, wherein said tuning signal is produced from said core layer.

12. The method of claim 10, further comprising the step of allocating an amplitude to sub-channels associated with each of said core and enhancement layers.

13. The method of claim 1, further comprising the step of allocating bandwidth to sub-channels associated with each of said first interleaved signal and said tuning signal.

14. The method of claim 10, wherein a different pseudo-noise sequence is assigned to each of said core and enhancement layers.

15. The method of claim 10, wherein said core layer is transmitted using parallel sub-channels.

16. The method of claim 10, wherein said enhancement layer is transmitted using parallel sub-channels.

17. The method of claim 10, wherein said core layer is transmitted using one or more serial sub-channels.

18. The method of claim 10, wherein said core layer is transmitted using one or more serial sub-channels.

19. A method for broadcasting a programming signal in a satellite broadcast system, comprising the steps of:
   interleaving said programming signal with a first interleaver producing a first interleaved signal having a first interleaver delay;
   interleaving said programming signal with a second interleaver producing a second interleaved signal having a second interleaver delay shorter than said first interleaver delay;
   broadcasting said first interleaved signal on a carrier frequency using at least a first orthogonal code; and
   broadcasting said second interleaved signal as a tuning signal on said carrier frequency using a second orthogonal code.

20. The method of claim 19, further comprising the step of synchronizing said tuning signal to said first interleaved signal.

21. The method of claim 19, wherein said satellite broadcast system comprises at least two satellites and one satellite broadcasts said first interleaved signal and a second satellite broadcasts said tuning signal.

22. The method of claim 19, wherein said first interleaved signal and said tuning signal are broadcast from a single satellite.

23. The method of claim 19, further comprising the steps of:
   interleaving said programming signal with a second interleaver producing a second interleaved signal having said first interleaver delay;
   time-shifting said second interleaved signal relative to said first interleaved signal to produce on-time and delayed versions of said programming signal; and
   broadcasting said second interleaved signal using at least one orthogonal code.

24. The method of claim 23, wherein said satellite broadcast system comprises at least two satellites and one satellite broadcasts said on-time version of said programming signal and a second satellite broadcasts said delayed version of said programming signal.

25. The method of claim 23, wherein said on-time and delayed versions of said programming signal are broadcast from a single satellite.

26. The method of claim 19, wherein said programming signal is encoded using a scalable audio coding scheme that includes a core layer and one or more enhancement layers.

27. The method of claim 26, wherein said tuning signal is produced from said core layer.

28. A method for receiving a programming signal corresponding to a program source in a satellite broadcast system, comprising the steps of:
   receiving a first interleaved signal having a first interleaver delay associated with said programming signal;
   receiving a tuning signal corresponding to said programming signal, wherein said tuning signal utilizes a shorter interleaver length than said first interleaved signal; and
   reproducing said program source from said tuning signal when a user selects a new program source.

29. The method of claim 28, further comprising the step of reproducing said program source from said first interleaved signal after a predefined period after said user selects said new program.

30. The method of claim 29, further comprising the step of applying said first interleaved signal to a first de-interleaver having a first interleaver delay.

31. The method of claim 28, further comprising the step of reproducing said program source from said first interleaved signal and said tuning signal after a predefined period after said user selects said new program.

32. The method of claim 28, wherein said tuning signal is interleaved with a second interleaver having a second interleaver delay and said method further comprises the step of applying said tuning signal to a second de-interleaver having a second interleaver delay.

33. The method of claim 28, wherein said satellite broadcast system comprises at least two satellites and said first interleaved signal is received from one satellite and said tuning signal is received from a second satellite.

34. The method of claim 28, wherein said first interleaved signal and said tuning signal are received from a single satellite.

35. The method of claim 28, further comprising the steps of:
   receiving a second interleaved signal having said first interleaver delay and time-shifted relative to said first interleaved signal; and
   reproducing said program source from one or more of said first and second interleaved signals after a predefined period after said user selects said new program.

36. The method of claim 35, wherein said first and second interleaved signals provide on-time and delayed versions of said programming signal.

37. The method of claim 36, wherein said satellite broadcast system comprises at least two satellites and said on-time version of said programming signal is received from a first satellite and said delayed version of said programming signal is received from a second satellite.

38. The method of claim 36, wherein said on-time and delayed versions of said programming signal are received from a single satellite.

39. The method according to claim 36, further comprising the steps of delaying said on-time version of said programming signal and combining said on-time and delayed versions of said programming signal to recover said programming signal.

40. The method of claim 28, wherein said programming signal is encoded by a transmitter using a scalable audio coding scheme that includes a core layer and one or more enhancement layers and wherein said tuning signal is reproduced from said core layer.

41. A satellite broadcast system, comprising:
   at least one geo-synchronous satellite for broadcasting a first interleaved signal corresponding to a program source on a carrier frequency using at least a first orthogonal code and a tuning signal corresponding to said program source, wherein said tuning signal utilizes a shorter interleaver length than said first interleaved signal; and
   a receiver for recovering said program source from at least one of said first interleaved signal or said tuning signal.

42. The satellite broadcast system according to claim 41, further comprising a second geo-synchronous satellite for broadcasting at least one of said first interleaved signal and said tuning signal.

43. The satellite broadcast system according to claim 41, further comprising a terrestrial repeater for broadcasting at least one of said first interleaved signal and said tuning signal.

44. The satellite broadcast system according to claim 41, wherein said receiver reproduces said program source from said first interleaved signal after a predefined period after said user selects said new program.

45. The satellite broadcast system according to claim 41, wherein said at least one geo-synchronous satellite produces said first interleaved signal using a first de-interleaver having a first interleaver delay.

46. The satellite broadcast system according to claim 41, wherein said receiver reproduces said program source from said first interleaved signal and said tuning signal after a predefined period after said user selects said new program.

47. The satellite broadcast system according to claim 41, wherein said tuning signal is interleaved with a second interleaver having a second interleaver delay and said at least one geo-synchronous satellite applies said tuning signal to a second de-interleaver having a second interleaver delay.

48. The satellite broadcast system according to claim 41, wherein said satellite broadcast system comprises at least two satellites and said first interleaved signal is broadcast by one satellite and said tuning signal is broadcast by a second satellite.

49. The satellite broadcast system according to claim 42, wherein said first interleaved signal and said tuning signal are broadcast by a single satellite.

50. The satellite broadcast system according to claim 41, wherein said at least one geo-synchronous satellite produces a second interleaved signal having said first interleaver delay and time-shifted relative to said first interleaved signal and said receiver reproduces said program source from one or more of said first and second interleaved signals after a predefined period after said user selects said new program.

51. The satellite broadcast system according to claim 50, wherein said first and second interleaved signals provide on-time and delayed versions of said programming signal.

52. The satellite broadcast system according to claim 51, wherein said satellite broadcast system comprises at least two satellites and said on-time version of said programming signal is broadcast by a first satellite and said delayed version of said programming signal is broadcast by a second satellite.

53. The satellite broadcast system according to claim 51, wherein said on-time and delayed versions of said programming signal are broadcast by the same satellite.

54. The satellite broadcast system according to claim 51, wherein said receiver delays said on-time version of said programming signal and combines said on-time and delayed versions of said programming signal to recover said program source.

55. The satellite broadcast system according to claim 41, wherein said programming signal is encoded by a transmitter using a scalable audio coding scheme that includes a core layer and one or more enhancement layers and wherein said tuning signal is reproduced from said core layer.

56. A receiver in a satellite broadcast system, comprising:
at least one antenna for receiving a first interleaved signal having a first interleaver delay associated with said programming signal and a tuning signal corresponding to said programming signal, wherein said tuning signal utilizes a shorter interleaver length than said first interleaved signal; and
a decoder for reproducing said program source from said tuning signal when a user selects a new program source.

57. A transmitter in a satellite broadcast system, comprising:
a first interleaver for producing a first interleaved signal corresponding to a programming signal having a first interleaver delay;
means for broadcasting said first interleaved signal on a carrier frequency using at least a first orthogonal code; and
means for broadcasting a tuning signal corresponding to said programming signal, wherein said tuning signal utilizes a shorter interleaver length than said first interleaved signal.

58. A transmitter in a satellite broadcast system, comprising:
a first interleaver for producing a first interleaved signal corresponding to a programming signal having a first interleaver delay;
a second interleaver for producing a second interleaved signal having a second interleaver delay shorter than said first interleaver delay;
means for broadcasting said first interleaved signal on a carrier frequency using at least a first orthogonal code; and
means for broadcasting said second interleaved signal as a tuning signal on said carrier frequency using a second orthogonal code.

59. A method for broadcasting a programming signal, comprising the steps of:
interleaving said programming signal with a first interleaver producing a first interleaved signal having a first interleaver delay;
broadcasting said first interleaved signal on a carrier frequency using at least a first orthogonal code; and
broadcasting a tuning signal corresponding to said programming signal, wherein said tuning signal utilizes a shorter interleaver length than said first interleaved signal.

60. The method of claim 59, wherein said signals are broadcast from a satellite.

61. The method of claim 59, wherein said signals are broadcast from a terrestrial transmitter.

* * * * *

UNITED STATES PATENT AND TRADEMARK OFFICE
CERTIFICATE OF CORRECTION

PATENT NO. : 6,876,623 B1
DATED : April 5, 2005
INVENTOR(S) : Lou et al.

It is certified that error appears in the above-identified patent and that said Letters Patent is hereby corrected as shown below:

Column 11,
Lines 5-6, before " $\sum_{k=0}^{3K}$ " and after " $\sum_{i=1,2}$ " replace " $\sum_{t}$ " with -- $\sum_{l}$ --.

Column 13,
Lines 7-8, cancel claim 18.

Column 15,
Line 27, after "claim" replace "42" with -- 41 --.

Signed and Sealed this

Thirtieth Day of May, 2006

JON W. DUDAS
*Director of the United States Patent and Trademark Office*